UNITED STATES PATENT OFFICE.

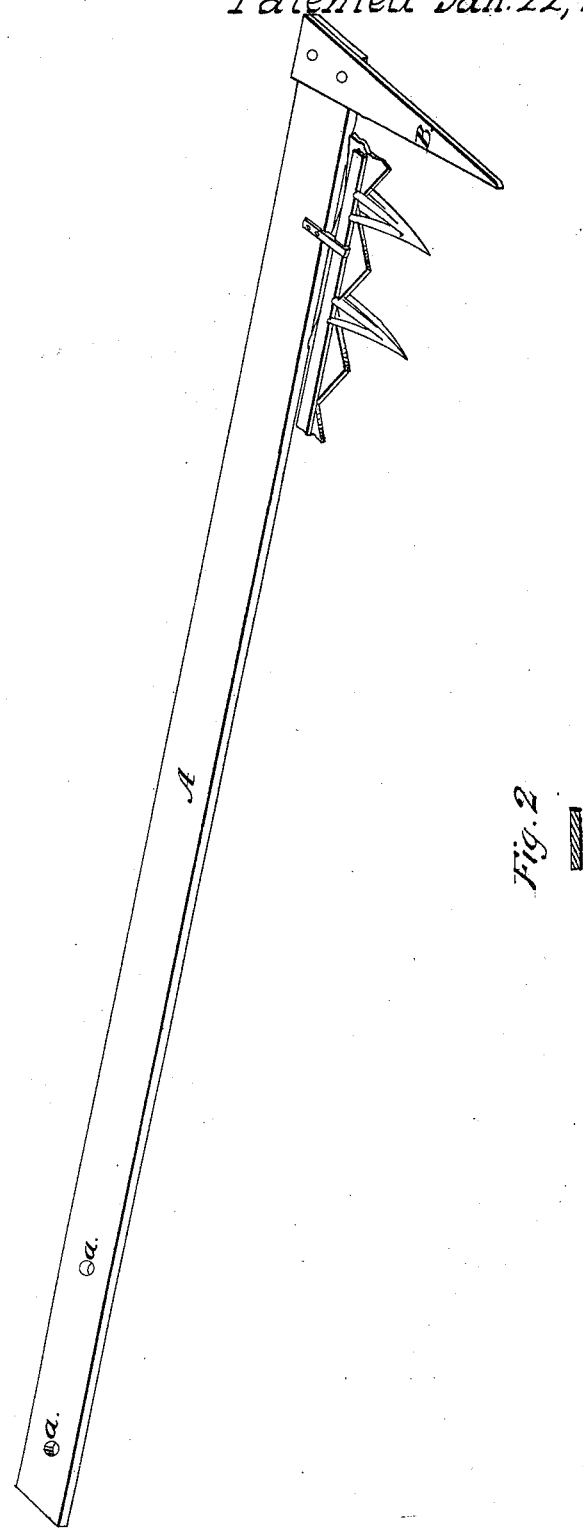

JOHN H. MANNY, OF ROCKFORD, ILLINOIS.

IMPROVEMENT IN HARVESTER-CUTTER BARS.

Specification forming part of Letters Patent No. 14,149, dated January 22, 1856.

*To all whom it may concern:*

Be it known that I, JOHN H. MANNY, of Rockford, in the county of Winnebago and State of Illinois, have invented certain new and useful Improvements in Machines for Harvesting Grain and Grass, of which the following is a full, clear, and exact description, reference being had to the accompanying drawing, which makes part of this specification, and which represents a view in perspective of that part of a harvesting-machine commonly called the "finger-bar," being the bar at the front edge of the platform that supports the fingers, cutter, and divider.

Machines for harvesting as heretofore constructed have not been as efficient as is desirable for mowing short grass and grain, because of the finger-bars therein being so bulky and standing so high as to obstruct the falling of the cut grass and grain over them upon the stubble, whence it was cut. Whenever heretofore the thickness of the finger-bar has been diminished to permit short grain and grass to pass over it more freely, it has proved too flexible to keep straight and allow the cutter to play freely without binding. Further, when it has been attempted to give the requisite increase of rigidity to the finger-bar by increasing its width without increasing its thickness, its great width has caused it to operate like a platform to catch the grass and support it until a load had accumulated sufficient to choke the cutter or otherwise obstruct the action of the machine. Further, the finger-bar as heretofore constructed has been liable to twist and bend, and when so twisted or bent to become set in that in shape. Various adjustments have been contrived to compensate this change in shape, in order to keep all the fingers in a straight line and the edge of the cutter throughout its entire length at an equal height from the ground, so as to cut the stubble of equal length on level ground. After much reflection on the subject of these defects in the reaping-machine and the means of curing the same I conceived the idea of making the finger-bar of steel, which possesses such great strength, stiffness, and elasticity combined that a finger-bar sufficient to secure all these qualities in the requisite degree would not be so high or so wide as to obstruct the delivery of the cut grass or grain on the stubble behind the bar. I have thoroughly tested such a finger-bar, and find it answers the purpose admirably.

The accompanying drawing represents a finger-bar, A, made of steel, which may have a spring temper given to it by heating and cooling, rolling, or hammering, such as would be suitable for carriage-springs. If the bar were made of cast-steel, (which I prefer as being the strongest and best material,) the temper should not be quite so high as would be necessary if German, spring, or blister steel were used, that metal being harder and more brittle than these. The holes $a\ a$ near one end of the bar are for bolts to pass through to fasten it to the frame of the machine. The wedge-formed piece B, attached to the opposite and outer end of the bar, represents a wedge or divider for separating the grass or grain to be cut in the swath in which the machine is advancing from that which is to be left standing until the next swath is cut.

The section of the bar shown at Fig. 2 is a parallelogram; but any other form of bar may be adopted which the constructor may deem better calculated to distribute the strength of the metal in proportion to the amount and direction of the strains to which it will be subjected during the working of the machine—as, for example, the steel finger-bar may be so shaped that its transverse section will resemble the two adjacent sides of a hollow parallelogram, or three of the adjacent sides of such a body, or it may be curved like the quadrant or half of a hollow cylinder, or its transverse section may be of a wedge or of a V form, or its form may be a combination of two or more of these already named, or of other forms that may be preferred, provided they are not such as to give too great a width or thickness to the finger-bar, my invention being irrespective of form, and relating only to peculiarities of size and material, and the new functions and capacities given to the machine by these qualities. The fingers can be secured to this bar by means of rivets or screws, or both, as may be deemed advisable.

What I claim as my invention, and desire to secure by Letters Patent, is—

The tempered-steel finger-bar by which the delivery of the cut grain or grass upon the stubble is facilitated and other advantages attained, as herein described.

In testimony whereof I have hereunto subscribed my name.

JOHN H. MANNY.

In presence of—
   P. H. WATSON,
   A. E. H. JOHNSON.